United States Patent [19]

Sloan

[11] Patent Number: 4,668,007
[45] Date of Patent: May 26, 1987

[54] VEHICLE COVER STRUCTURE

[76] Inventor: Frank P. Sloan, 42 Edgemore Drive, Toronto, Ontario, Canada, M8Y 2N3

[21] Appl. No.: 785,692

[22] Filed: Oct. 9, 1985

[30] Foreign Application Priority Data

Oct. 10, 1984 [CA] Canada ................................. 465104

[51] Int. Cl.$^4$ ............................................. B62D 25/00
[52] U.S. Cl. .................................. 296/136; 296/1 S; 296/100; 296/181
[58] Field of Search ............... 296/181, 182, 136, 100; 135/88

[56] References Cited

U.S. PATENT DOCUMENTS 2,688,513 9/1954 Poirier ................................. 296/136
2,801,667 8/1957 Curran ................................ 296/136
4,092,039 5/1978 Lutkenhouse ...................... 296/181

Primary Examiner—Robert R. Song
Attorney, Agent, or Firm—Rogers & Scott

[57] ABSTRACT

A screen or cover is provided for use on vehicles to cover the side of a trailer and the like to protect the contents such as automobiles. The screen also enhances the aerodynamic efficiency of the vehicle and includes a panel having peripheral tubes extending between the selected locations on the periphery of the panel and coupled to the panel. The periphery of the panel between adjacent pairs of the selected locations is cut back from the intended final position of the periphery and at least one cable is threaded through the peripheral tubes. Button means are provided for attachment to the side of the trailer at positions to receive and support the cable where the cable is exposed at the selected locations, and means adapted to tension the cable is provided. This last means is used to draw the cable tight over the buttons so that the panel is tensioned as the cable is pulled straight against the resistance of the panel where it is cut back between the buttons.

8 Claims, 5 Drawing Figures

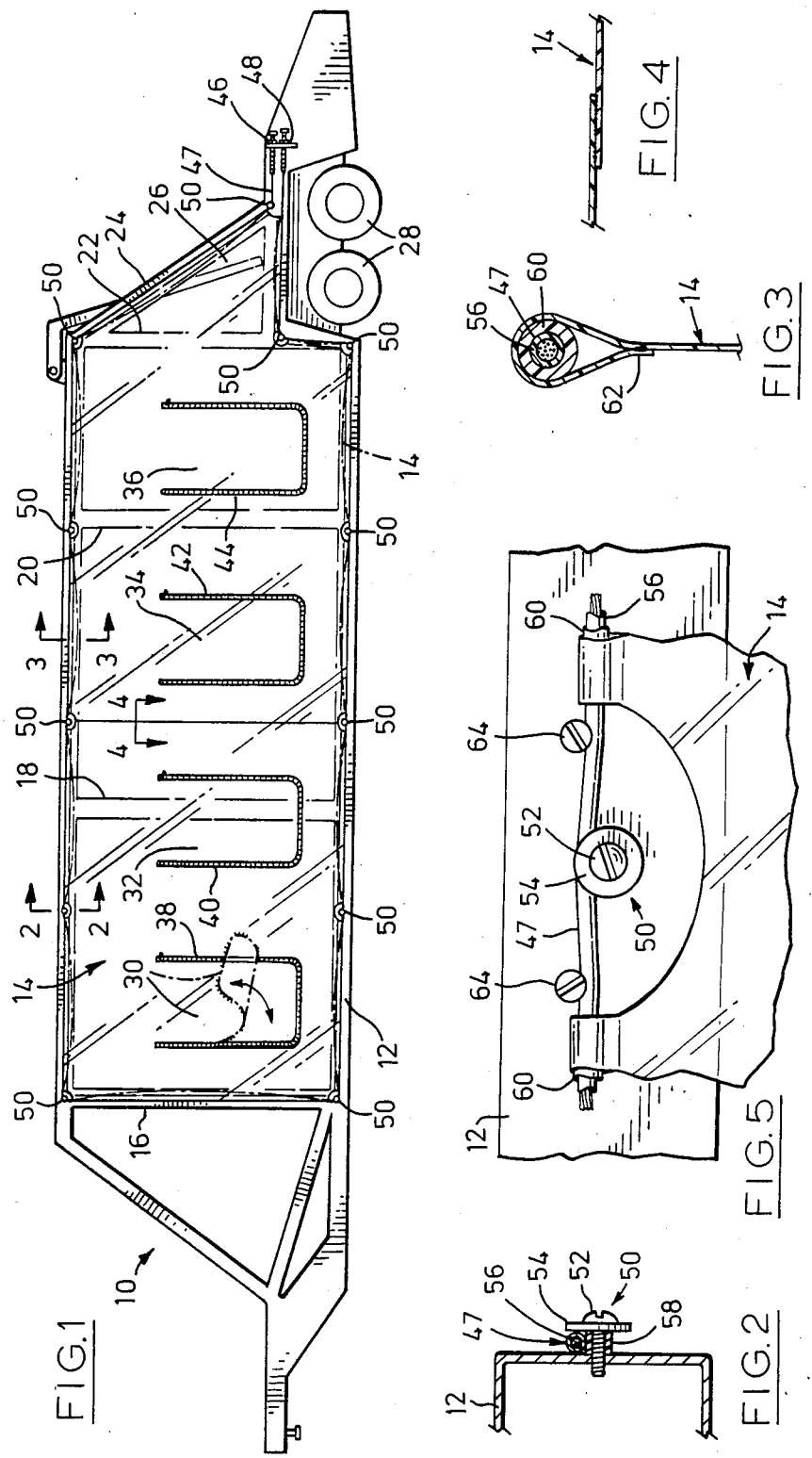

VEHICLE COVER STRUCTURE

This invention relates to protective screens or covers especially for use in covering the sides of open-framed vehicles to protect the contents of the vehicle from damage and to improve the aerodynamic qualities of the vehicle.

The invention will be described for use especially with vehicles used to transport smaller automobiles, such as family cars. It will be evident however that the structures described and claimed have other uses.

Automobiles are commonly transported on large vehicles with the automobiles arranged on moveable supporting tracks which are adjusted and angled vertically relative to one another in order to accommodate as many automobiles as possible. These tracks are adjusted by hydraulics and supported on large fixed sideframes. There is very little space wasted with the result that access must be provided from sides of the vehicle to permit attaching the automobiles to the tracks and to ensure that all of the necessary adjustments and connections have been made. These requirements have to date made it impossible to cover the sides of such vehicles. However, it has been well recognized that covering vehicles sides would result in significant savings in fuel because of the enhanced aerodynamics of the vehicle. Also, because the vehicle is subject to the usual road hazards such as flying stones and splashing, the automobiles would be protected and less subject to such hazards.

It is therefore an object of the present invention to provide protective screens or covers which can be attached to vehicles to cover sides or other parts of the vehicle and yet provide visual inspection of the automobiles on the vehicle and also allow for access to make connections and adjustments.

These and other objects of the invention will be better understood with reference to the drawings in which:

FIG. 1 is a diagrammatic side view of the trailer but of a vehicle used to transport automobiles and having a screen according to the invention attached to the side of the trailer;

FIG. 2 is a sectional view on line 2—2 of FIG. 1 and drawn to a larger scale;

FIG. 3 is a section on line 3—3 of FIG. 1 drawn to the same scale as FIG. 2;

FIG. 4 is a sectional view on line 4—4 of FIG. 1 to the scale used for FIG. 2; and FIG. 5 is a side view of part of the vehicle and drawn to a larger scale than that used for FIG. 1

Reference is made first to FIG. 1 which illustrates diagrammatically a trailer 10 used as part of a vehicle to transport automobiles. The trailer includes a pair of heavy supporting side frames 12 (one of which can be seen) and automobiles carried by the trailer are positioned between these frames 12 using adjustable tracks and ramps which are not shown in the drawing. Such an arrangement is conventional in North America for transporting automobiles and small trucks.

On the side frame 12 is mounted a screen or cover designated generally by the numeral 14. This screen includes a filmic panel which extends from a front upright 16 past similar uprights 18, 20 and 22 and terminates at an inclined rear edge 24. At the bottom, the screen 14 is stepped up the upright 22 terminating at a horizontal portion 26 over a pair of wheels 28.

As will be described, the arrangement of the screen 14 is such that it can be tensioned for when the vehicle is in use and relaxed to allow access through U-shaped flaps 30, 32, 34, 36 which are defined respectively by zippers 38, 40, 42 and 44. The zippers are of course used only when the structure is relaxed, otherwise damage could result. Tensioning is provided by a cable 47 which extends around the structure and has ends at respective ratchet tensioners 46, 48 of any suitable conventional type.

It will also be seen from FIG. 1 that the cable 47 is supported on the side frame 12 by a series of buttons 50 spaced around the side frame and which will be described in more detail with reference to FIG. 2. These button 50 permit the cable 47 to move over them to tension the screen 14 from a relaxed position indicated in ghost outline to a tensioned position as shown in FIG. 1. The relaxed position is characterized by a manufactured condition and the scalloping effect comprising scalloped portions of the panel created by cutting bark the periphery of the panel adapted to be located in use between adjacent pairs of buttons 50. This scalloping provides tensioning of the screen 14 when the cable 47 is brought into a straight condition between pairs of the buttons 50.

It is preferable to make the filmic panel of the screen 14 from polyvinylchloride (PVC) of 30 guage thickness.

As seen in FIG. 2 the buttons 50 consist of a machine screw 52 threaded into a member of the side frame 12. A washer 54 is provided under the screw head to better locate cable 47 which is positioned loosely between the washer 54 and the frame 12.

As can also be seen in FIG. 2, the cable 47 has a core of steel strands covered in a molded sheath 56 of a suitable synthetic plastic material to minimize friction between the cable 47 and other parts as will be described.

The button 50 also includes a synthetic plastic sleeve 58 on which the cable 47 rides to also minimize friction.

Reference is next made to FIG. 3 which is a section through a typical part of the edge of the screen 14. It will be seen that the main filmic panel of the screen 14 terminates at its edge in a portion which is wrapped around a tubular element 60 through which the cable 47 passes. The structure is overlapped at 62 and welded. The tubular element 60 is trapped inside, and if preferred can be welded or glued to, the main part of the screen 14. This minimizes stress at the edge because it provides a larger bearing area for the filmic material and also provides a surface for the cable 47 to slide on.

As can be seen in FIG. 5, portions of the screen panel are cut away to expose the cable 47 at positions adjacent to the buttons 50 and between the scalloped portions of the panel.

The large area of the screen 14 is in fact made up of several panels which are attached to one another as best seen in the sectional view of FIG. 4. Here it will be seen that adjacent panels are overlapped and welded to one another and this can be repeated as often as it is necessary to provide an area big enough to cover the side of the trailer.

The rear end of the screen 14 has been formed to provide further coverage but also to provide a lead into the ratchet devices 46, 48 so that it will be appreciated that when these devices are used to tension the cable 47, the cable will move about the buttons 50 and slide through the tubular arm 60 (FIG. 3) thereby pulling the filmic material into the condition shown in FIG. 1 and out of the condition shown in ghost outline. This results in a tension in the material to hold it in place. It is important to note that the PVC material has a memory so that when the vehicle has reached its destination and the automobiles are to be removed, the cable 47 can be relaxed and the material will again take up the position shown in ghost outline where, because the stress is removed, the zippers 38, 40, 42, 44 can be undone to provide access through the screen 14 to the vehicles.

A minor refinement which improves the stability of the structure is shown in FIG. 5. In order to minimize the risk that the cable 47 will come off one of the buttons 50, particularly when it is relaxed, FIG. 5 shows a a button 50 having two locators 64 adjacent the button and made up in a similar fashion to the button with the washer 54 removed. These locators 64 are placed sufficiently close to the button 50 so that the cable 47 is biased to stay in contact with the button even when the tension is removed from the cable. In some instances one of the locators 64 would be sufficient but where there is a real risk of displacement because of the cable arrangement, two locators would be used.

It will be evident from the foregoing description that the screen or cover according to the invention can be used to cover in trailers or trucks having fixed frames of various shapes and proportions. Access may not always be necessary so that the zippers are optional. On the otherhand, the general arrangement would be similar in that the cables would skirt the periphery of the screen and would be guided so that they could be tensioned to create tensile forces in the screen to hold it in position.

There are many advantages to the structure. The obvious advantage of reduced windage and increased aerodynamic efficiency are complemented by an unexpected improvement. For instance, on many roads in winter splashing occurs and the water carries salt which is corrosive and has to be washed off the automobiles and off the vehicle itself. The PVC film rejects water and snow and stays quite clean making cleaning in cold weather less necessary than when the trailer is used without the screen.

In some instances damage occurs to the automobiles from small stones thrown by other vehicles, and of course these are deflected by the screen and would not therefore hit the automobiles behind the screen.

One of the major advantages however is the fact that the filmic material of the screen panel can be transparent. When loading automobiles onto trailers it is imperative that the trailer be adjusted with the automobiles in the right positions to avoid damage caused by the automobiles rubbing against parts of the trailer or projecting out of the trailer and being vulnerable to impact under bridges, etc. Commonly these vehicles are loaded and then passed through an inspection station where all of these details are inspected. The transparent cover makes it possible for an inspector to see all of the attachments and the automobiles inside. If he considers it necessary to physically check something then he can undo the zipper and enter the trailer.

These and other advantages will be apparent from the foregoing description. Further, changes to the preferred embodiment can be made within the scope of the invention as described and claimed.

I claim:

1. A screen for use on vehicles to cover a side of a trailer and the like for protecting the contents such as automobiles and to enhance the aerodynamic efficiency of the vehicle, the screen comprising:

a panel having a plurality of peripheral tubular elements each extending between selected locations on the periphery of the panel and coupled to the panel, the periphery of the panel between adjacent pairs of the selected locations defining a scalloped portion which is cut back from the intended final position of the periphery and which is coupled to the tubular elements;

at least one cable threaded through said peripheral tubular elements, the cable being exposed between said scalloped portions;

peripheral button means for attachment to the side of the trailer at positions to receive and support the cable where the cable is exposed; and tension means adapted to tension the cable by drawing it tightly over the buttons whereby the panel is tensioned as the cable is pulled straight between pairs of the buttons against the resistance of the scalloped portions of the panel.

2. A screen according to claim 1 in which the tubular elements are coupled to the panel by overlapping the panel at the periphery to form a hem and inserting the tubular element inside the hem.

3. A screen according to claim 2 in which the tubular element is fixed to the hem.

4. A screen according to claim 1 in which the cable has a core of steel strands covered in a moulded sheath of synthetic plastic material adapted to minimize friction between the cable and the tubular element and between the cable and the button means.

5. A screen according to claim 4 in which the button means includes a synthetic plastic sleeve on which the cable rides.

6. A screen according to claim 1 including pairs of locators associated with the button means, one locator being attached to the side of the trailer to either side of the button means so as to bias the cable to stay in contact with the button means even when tension is removed from the cable.

7. A screen according to claim 1 in which the panel is made of transparent material.

8. A screen according to claim 1 and including zipper means defining a flap which can be opened to afford access through the screen.

* * * * *